(12) United States Patent
Ohtomo et al.

(10) Patent No.: US 7,061,726 B2
(45) Date of Patent: Jun. 13, 2006

(54) THIN FILM MAGNETIC HEAD

(75) Inventors: Shigekazu Ohtomo, Fujisawa (JP); Hiroshi Fukui, Fujisawa (JP); Sunao Yonekawa, Fujisawa (JP); Yoji Maruyama, Fujisawa (JP); Tadayuki Iwakura, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 190 days.

(21) Appl. No.: 10/667,232

(22) Filed: Sep. 18, 2003

(65) Prior Publication Data

US 2004/0223265 A1  Nov. 11, 2004

(30) Foreign Application Priority Data

May 9, 2003  (JP)  .............................. 2003-130983

(51) Int. Cl.
 *G11B 5/127* (2006.01)
(52) U.S. Cl. .................................... 360/319
(58) Field of Classification Search ................ 360/319, 360/317, 126, 324.1, 324.11, 324.2, 324.21
 See application file for complete search history.

(56) References Cited

U.S. PATENT DOCUMENTS

| | | | |
|---|---|---|---|
| 6,456,466 B1 * | 9/2002 | Nakamoto et al. | 360/319 |
| 6,563,677 B1 * | 5/2003 | Narumi et al. | 360/319 |
| 6,751,055 B1 * | 6/2004 | Alfoqaha et al. | 360/126 |
| 6,775,108 B1 * | 8/2004 | Kief et al. | 360/319 |
| 6,788,497 B1 * | 9/2004 | Cates | 360/126 |
| 6,842,308 B1 * | 1/2005 | Pust et al. | 360/234.7 |
| 6,859,343 B1 * | 2/2005 | Alfoqaha et al. | 360/126 |
| 2002/0176208 A1 * | 11/2002 | Serpe et al. | 360/235.7 |
| 2003/0081359 A1 * | 5/2003 | Pust et al. | 360/319 |
| 2004/0037012 A1 * | 2/2004 | Nakanishi et al. | 360/317 |
| 2005/0036238 A1 * | 2/2005 | Tabakovic et al. | 360/234.5 |

FOREIGN PATENT DOCUMENTS

| | | |
|---|---|---|
| JP | 2000285423 A | 10/2000 |
| JP | 2001034916 A | 2/2001 |
| JP | 2001176031 A | 6/2001 |
| JP | 2001291211 A | 11/2001 |

\* cited by examiner

*Primary Examiner*—Allen Cao
(74) *Attorney, Agent, or Firm*—Townsend and Townsend and Crew LLP

(57) ABSTRACT

A magnetic material having a low coefficient of thermal expansion of $11.5 \times 10^{-6}$/K or less is used for forming at least one of a lower shield or an upper shield. A laminated film comprising a layer of the magnetic material having a low coefficient of thermal expansion of $11.5 \times 10^{-6}$/K or less, and an 80 wt % NiFe alloy layer, is used for forming at least one of the lower shield and the upper shield. Thus, the thin film magnetic head having reduced after-record noise and reduced thermal protrusion can be obtained.

14 Claims, 3 Drawing Sheets

(a)

(b)

THIN FILM MAGNETIC HEAD

CROSS-REFERENCE TO RELATED APPLICATIONS

This application claims priority to Japanese application No. 2003-130983, filed May 9, 2003, the disclosure of which is incorporated by reference.

BACKGROUND OF THE INVENTION

1. Field of the Invention

The present invention relates to a thin film magnetic head used in a disk storage device. In particular, the invention relates to a thin film magnetic head that achieves a low flying height suitable for high-density recording with high reliability.

2. Description of Related Art

In recent years, an increase in recording density of a disk storage device has raised demands for improvements in performance of a recording medium and developments of a thin film magnetic head excellent in write/read characteristics. At present, a head using an MR (Magnetoresistive) element or a GMR (Giant Magnetoresistive) element, both of which are capable of achieving a high read output, is used as a read head. In addition, a TMR (Tunneling Magnetoresistive) element capable of achieving higher read sensitivity is being developed as the read head. On the other hand, a conventional inductive thin film magnetic head exploiting the electromagnetic induction is used as a write head. Also, the above-mentioned read head and write head are combined into one magnetic head to be used as an integrated read/write thin film magnetic head.

As shown in FIG. 6 of Japanese published application JPA 2001-176031, the conventional read/write thin film magnetic head is obtained by forming a lower shield 111, a read element 113, and a mid shield 112 serving as an upper shield and a lower pole piece on a substrate 103, and then forming a write gap 102a, a thin film coil 106, an upper pole piece 114, and other components on the mid shield 112, followed by coating with an alumina protection film 115. However, as disclosed in Japanese published application JPA 2001-176031, since a write current tends to affect a magnetic domain of the mid shield, which in turn affects the read element, the read output is fluctuated thereby and causes noise. Therefore, a countermeasure is proposed which reduces noise in read output by dividing the mid shield into an upper shield 4 and a lower pole piece 5 that are separated from each other with a non-magnetic layer 4a in-between as shown in FIGS. 1 and 4 of Japanese published application JPA 2001-176031 so as to reduce the change in magnetic domain of the upper shield caused by the write operation. This countermeasure is currently put to practical use.

In recent years, a reduction in a head-disk space, i.e., a reduction in flying height, has been attained in order to improve the recording density, but the reduction in flying height has caused a problem known as "thermal protrusion". This is a protrusion, due to thermal expansion of the air bearing surface of the magnetic head when a disk storage device is used in a hot environment. The thermal protrusion is caused when the metal portion having a high coefficient of thermal expansion and organic substances such as a resist of a thin film magnetic head thermally expand in a hot environment, to protrude above the height of a substrate formed of $Al_2O_3$—TiC or the like having a low coefficient of thermal expansion at the air bearing surface. If a prominent thermal protrusion occurs, it is possible that a tip of the magnetic head comes in contact with the recording medium thereby wearing down or damaging itself or wearing down or damaging the medium. In an actual device, since a flying height at room temperature is set to a relatively great value in order to prevent the contact in a hot environment, write/read characteristics tend to be deteriorated at room temperature or in a hot environment, which makes it very difficult to increase recording density. Thus, in order to realize a disk storage device with high recording density, the thermal protrusion must be prevented.

In the conventional thin film magnetic heads, like those shown in FIGS. 1 and 4 of Japanese published application JPA 2001-176031, wherein the upper magnetic shield does not double as the lower pole piece, NiFe alloy films containing 80 wt % Ni, i.e., so-called permalloy films, are typically used as magnetic materials for the magnetic shield. Since the magnetic materials have a low coercive force and a low magnetostriction coefficient, they are suitably used as magnetic materials for the magnetic shield. However, such materials have a coefficient of thermal expansion of about $12.8 \times 10^{-6}$/K, that is larger than that of $Al_2O_3$—TiC, which is $7.1 \times 10^{-6}$/K, typically used for the substrate and $Al_2O_3$ used for a protection film. Therefore, a magnetic shield of a thin film magnetic head wherein an 80 wt % NiFe alloy (80 wt % Ni) film is used as the magnetic shield material protrudes above the height of the substrate at the air bearing surface in the direction of the medium in a hot environment. The height of the thermal protrusion is as small as about 1 nm per 10° C., but the change of 1 nm in the flying height has a significant influence on the write/record characteristics of the magnetic storage device with high recording density. Accordingly, the increase in flying height at room temperature to compensate for the amount of protrusion due to the temperature rise from the room temperature to about 60° C. leads to a considerable deterioration in the write/read characteristics. Therefore, if it is possible to reduce the flying height at room temperature by reducing the thermal protrusion even slightly, there will be improvement in the write/read characteristics.

SUMMARY OF THE INVENTION

Embodiments of the present invention are directed to a magnetic material having a low coefficient of thermal expansion used for a magnetic shield.

In a preferred embodiment, a magnetic material that has a coefficient of thermal expansion lower than that of an 80 wt % NiFe alloy is used for forming part or whole of a magnetic shield. A NiFe alloy containing 30 to 55 wt % of Ni has a reduced coefficient of thermal expansion as compared with that of the 80 wt % NiFe alloy. For example, a composition of 46 wt % NiFe provides a low coefficient of thermal expansion of about $8.5 \times 10^{-6}$/K. Also, such material has a soft magnetic property suitable for the magnetic shield. Therefore, it is possible to reduce the thermal protrusion of a thin film magnetic head, if such magnetic material is used as a part or whole of the magnetic shield.

Further, in another preferred embodiment of the present invention, at least one of a lower shield and an upper shield is a laminated film consisting of a layer formed from a 80 wt % NiFe alloy and a layer formed from a magnetic material having a low coefficient of thermal expansion. In this case, the layer of the 80 wt % NiFe alloy is disposed to face the read element while the layer of the magnetic material having the low coefficient of thermal expansion is disposed apart from the read element. As described above, the 80 wt. % NiFe alloy is characterized by low coercivity, a low magnetostriction coefficient, and an excellent soft magnetic property. On the other hand, while the magnetic material having a low coefficient of thermal expansion such as the NiFe alloy having a composition mainly comprising 46 wt % Ni is used for forming a pole piece of the head, the NiFe alloy is high in coercivity and magnetostriction coefficient as compared with the 80 wt % NiFe alloy. If the material having high coercivity and a high magnetostriction coefficient is used as the magnetic shield, an abnormal magnetic domain structure tends to be obtained. More specifically, the magnetic domain structure is changed due to a magnetic field that flows into the magnetic shield when a write current is applied to the magnetic head, which makes noise in read output liable to occur. In order to prevent such phenomenon, one layer of the magnetic shield adjacent to the read element is formed from the 80 wt % NiFe film, and the other layer is formed from the magnetic material having the low coefficient of thermal expansion. Thus, it is possible to prevent noise in read output and to reduce the thermal protrusion.

The present invention will hereinafter be described in more details through embodiments thereof.

Figure 1:
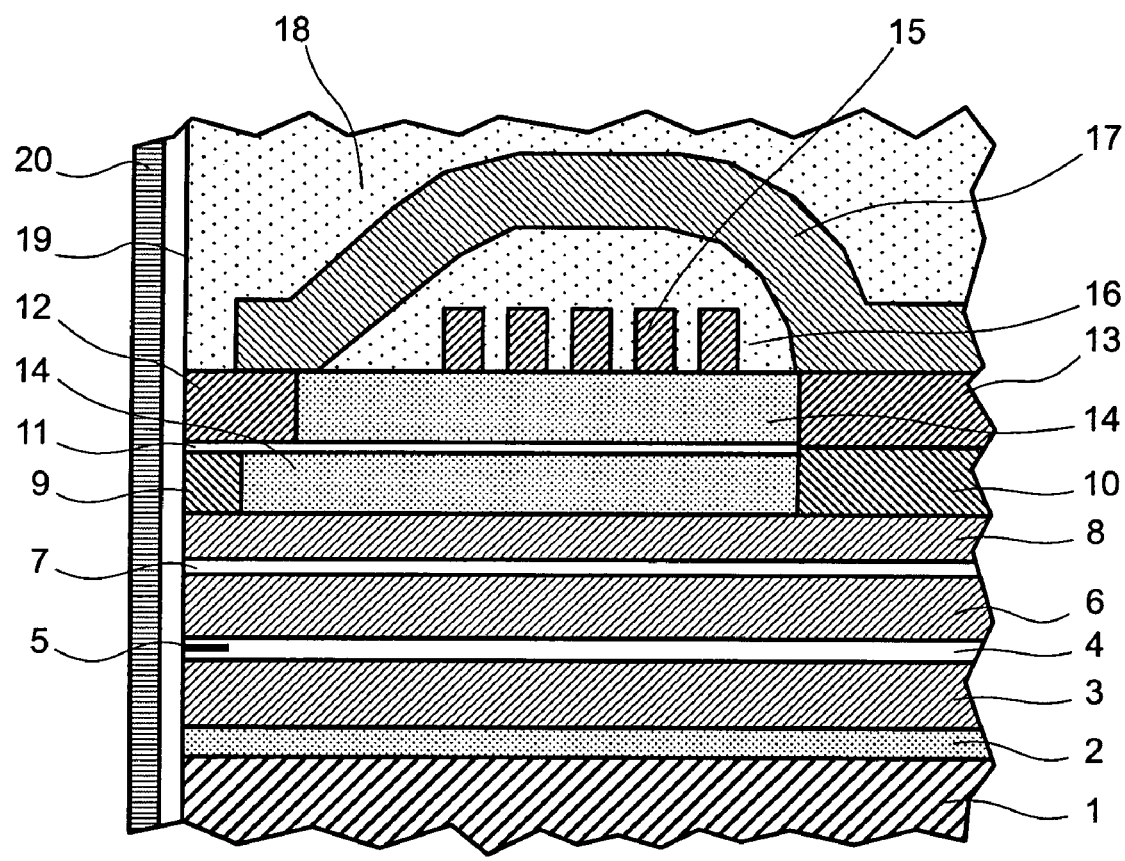
FIG. 1 is a cross-sectional view of a thin film magnetic head of the present invention.

The following table includes a description of reference numerals.

| 1   | substrate                     |
|-----|-------------------------------|
| 2   | base alumina                  |
| 3   | lower shield                  |
| 3a  | lower shield lower layer      |
| 3b  | lower shield upper layer      |
| 4   | read gap                      |
| 5   | read element                  |
| 6   | upper shield                  |
| 6a  | upper shield upper layer      |
| 6b  | upper shield lower layer      |
| 7   | separation layer              |
| 8   | lower pole piece              |
| 9   | lower pole front end layer    |
| 10  | lower pole back end layer     |
| 11  | read gap layer                |
| 12  | upper pole front end layer    |
| 13  | upper pole back end layer     |
| 14  | non-magnetic insulation layer |
| 15  | coil                          |
| 16  | coil insulation layer         |
| 17  | upper pole piece              |
| 18  | protection layer              |
| 19  | air bearing surface           |
| 20  | recording medium              |
| 21  | main pole piece               |
| 22  | insulation layer              |
| 23  | side shield                   |

DESCRIPTION OF ILLUSTRATIVE EMBODIMENTS

FIG. 1 is a cross-sectional view of a thin film magnetic head of a first embodiment. On a substrate 1 formed from a non-magnetic material, a base alumina 2 is applied so as to provide surface smoothness and electrical insulation properties. A lower shield 3 formed from a magnetic material having low coefficient of thermal expansion is provided on the base alumina 2 in order to improve read resolution and to eliminate influences of external magnetic fields. A read gap 4 formed of a non-magnetic insulating material is provided on the lower shield 3. A read element 5 formed of an MR element or a GMR element is disposed in the read gap. On the read gap 4, an upper shield 6 formed from a magnetic material having low coefficient of thermal expansion is provided. A separation layer 7 that is formed from a non-magnetic material is provided on the upper shield 6 to be used for separating a write head from a read head. A write unit is formed on the separation layer 7. The write unit 7 includes a lower pole piece 8, a lower pole front end layer 9, a lower pole back end layer 10, a write gap 11, an upper pole front end layer 12, an upper pole back end layer 13, a non-magnetic insulation layer 14, a coil 15, a coil insulation layer 16, an upper pole piece 17, and a protection layer 18.

In write operation, a write current is applied to the coil 15 to induce a magnetic flux in the upper pole piece 17, upper pole back end layer 13, the lower pole back end layer 10, the lower pole piece 8, the lower pole front end layer 9, and the upper pole front end layer 12, and a write magnetic field is generated from the write gap 11 so that signal magnetization is written on a recording medium 20 that rotates with a flying height being maintained as a space between the recording medium 20 and an air bearing surface 19.

Figure 2:
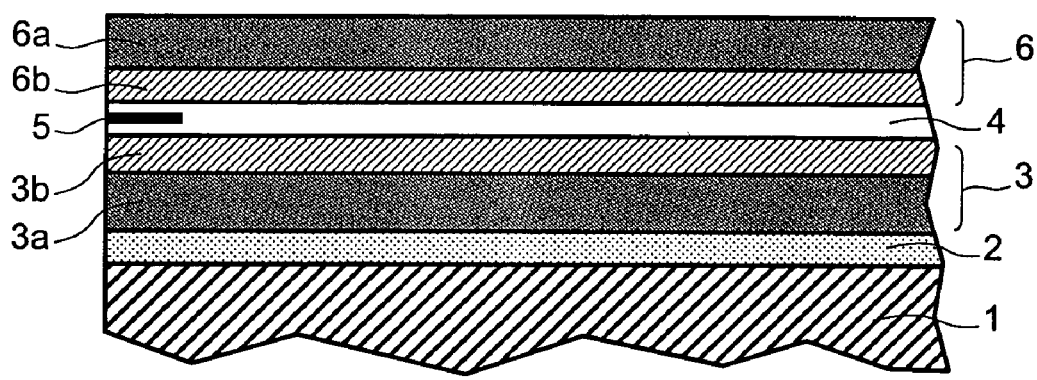
FIG. 2A is a cross-sectional view of a multilayered magnetic shield of the thin film magnetic head of the present invention.
FIG. 2B is a cross-sectional view of a multilayered magnetic shield of the thin film magnetic head of the present invention.
Figure 2:
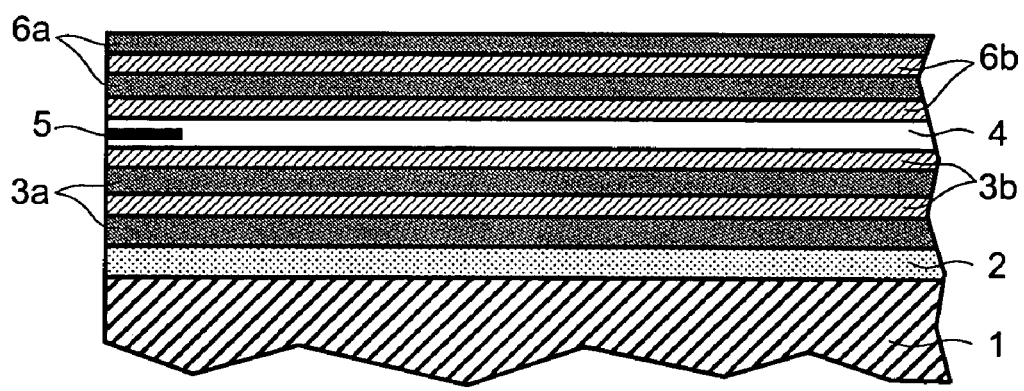

In another embodiment of the present invention, a lower shield 3 has a lower shield lower layer 3a formed from a magnetic material having a low coefficient of thermal expansion and a lower shield upper layer 3b formed from an 80 wt % NiFe alloy as shown in FIG. 2A. In addition, an upper shield 6 has an upper shield upper layer 6a formed from a magnetic material having a low coefficient of thermal expansion and an upper shield lower layer 6b formed from a 80 wt % NiFe alloy.

Heat deformations of the thin film magnetic head of the present embodiment (shown in FIG. 1) and the conventional thin magnetic head were calculated to determine those thermal protrusions. The head of the present embodiment has the lower shield 3 and the upper shield 6, both of which are formed from the magnetic material having a low coefficient of thermal expansion. On the other hand, the conventional head has the lower shield 3 and the upper shield 6, both of which are formed from the 80 wt % NiFe alloy. In addition, the thermal protrusion of the thin film magnetic head (shown in FIG. 2A) having the magnetic shields each of which is the stack of layers consisting of the layer of the magnetic material having a low coefficient of thermal expansion and the 80 wt % NiFe alloy layer was also determined.

Materials used for the components other than the magnetic shields were as follows: the substrate 1 was formed from $Al_2O_3$—TiC; the lower pole piece 8, the lower pole front end layer 9, the lower pole back end layer 10, the upper pole front end layer 12, the upper pole back end layer 13, and the upper pole piece 17 were formed from 46 wt % NiFe; the read gap 4, the separation layer 7, the write gap 11, and the protection layer 18 were formed from $Al_2O_3$; the coil 15 was formed from Cu; and the coil insulation layer 16 was formed from photoresist. Properties of the materials are shown in Table 1.

TABLE 1

| Material | Thermal Conductivity (μW/μmK) | Young's Modulus (Gpa) | Poisson's Raito | Coefficient of Linear Thermal Expansion ($10^{-6}$/K) |
|---|---|---|---|---|
| $Al_2O_3$—TiC | 20 | 390 | 0.22 | 7.1 |
| $Al_2O_3$ | 1.3 | 410 | 0.25 | 7.1 |
| 80 wt % NiFe | 35 | 200 | 0.3 | 12.8 |
| 46 wt % NiFe | 35 | 144 | 0.3 | 8.5 |
| photoresist | 0.5 | 3.7 | 0.35 | 30 |
| Cu | 403 | 110 | 0.3 | 16.2 |

The thermal protrusion per 10° C. of temperature rise at each of the lower shields was calculated under the above-described conditions. The calculations are shown in Table 2.

TABLE 2

| Head Structure | Conventional Example | Example 1 | Example 2 | Example 3 |
|---|---|---|---|---|
| lower shield lower layer material thickness (μm) | 80 wt % NiFe 2.1 | 46 wt % NiFe 2.1 | 46 wt % NiFe 0.7 | 46 wt % NiFe 1.4 |
| lower shield upper layer material thickness (μm) | — | — | 80 wt % NiFe 1.4 | 80 wt % NiFe 0.7 |
| upper shield lower layer material thickness (μm) | 80 wt % NiFe 1.3 | 46 wt % NiFe 1.3 | 80 wt % NiFe 0.9 | 80 wt % NiFe 0.4 |
| upper shield upper layer material thickness (μm) | — | — | 46 wt % NiFe 0.4 | 46 wt % NiFe 0.9 |
| protrusion | 0.63 | 0.27 | 0.53 | 0.40 |
| protrusion ratio | 1 | 0.43 | 0.84 | 0.63 |

As shown in Table 2, the thermal protrusion of the thin film magnetic head of Example 1 wherein 46 wt % NiFe is used in place of 80 wt % NiFe for forming the magnetic shield is less than half that of the conventional example. Also, the thermal protrusion of Example 2 wherein about 30% of a total thickness of each of the upper shield and the lower shield is replaced by 46 wt % NiFe is reduced to about 80% of that of the conventional magnetic head. Further, the thermal protrusion of Example 3 wherein about 70% of a total thickness of each of the upper shield and the lower shield is replaced by 46 wt % NiFe is reduced to about 60% of that of the conventional magnetic head. Thus, the present invention is effective in reducing the flying height at room temperature and largely improving the write/read characteristics, particularly, the resolution and the output noise ratio.

According to the above results, it is apparent that the effective reduction of 15% or more in the thermal protrusion can be realized by setting the ratio of the thickness of the magnetic material layer having a low coefficient of thermal expansion to the sum of the thicknesses of the lower and upper shields to 30% or more.

In the present embodiment, the NiFe-based alloy is used by way of an example of the magnetic material having a low coefficient of thermal expansion. Coefficients of thermal expansion of NiFe-based alloys are listed in FIG. 7–113 on page 342 of "Handbook of Magnetic Materials" which was published in 1975. The coefficient of thermal expansion decreases gradually from the Ni content of 100% to reach $11.5 \times 10^{-6}$/K when the Ni content is 55% and then it decreases sharply with reduction in Ni content. The coefficient of thermal expansion starts to increase when the Ni content is 25% and then exceeds $11.5 \times 10^{-6}$/K when the Ni content is less than 30%. Accordingly, the thermal protrusion is largely reduced by the use of the NiFe alloy having the Ni content of 30 to 55 wt % as the magnetic material having a low coefficient of thermal expansion of the present embodiment in accordance with the same calculations as those used in Table 2. If the material having the coefficient of thermal expansion of $11.5 \times 10^{-6}$/K is used for the lower and upper shields, it is possible to realize the effective reduction of 15% or more in thermal protrusion as compared with the conventional magnetic head. The 15% reduction in thermal protrusion is obtainable from the calculation used for obtaining the results shown in Table 2. The effect of 15% reduction in thermal protrusion is such that the thermal protrusion in the conventional example of Table 2 caused by 50° C. of temperature rise is reduced by about 0.5 nm. In addition, the thermal protrusion in the conventional example of Table 3 is reduced by about 0.7 nm. Table 3 will be described later in this specification. In order to reduce the thickness of the protection film, for example, on the surface of the head by about 0.5 to 0.7 nm for the purpose of reducing the flying height, it is necessary to carry out very difficult technology developments. Therefore, the reduction in thermal protrusion described above is significantly effective in reducing the flying height.

While the magnetic material having a low coefficient of thermal expansion is used for both of the upper shield and the lower shield in Example 1, it is possible to reduce the thermal protrusion by using the magnetic material for either one of the shields. Also, while the upper shield and the lower shield of each of Examples 2 and 3 are each the stack of layers, which consists of the layer of the magnetic material having a low coefficient of thermal expansion and the 80 wt % NiFe alloy layer, it is possible to reduce the thermal protrusion by using the stack of layers for either one of the shields.

A structure of the stack of layers of the NiFe-based alloy having a low coefficient of thermal expansion and the NiFe-based alloy having a high coefficient of thermal expansion is not limited to the two-layered structure. A three- or more layered structure or a layered structure consisting of three or more layers of NiFe-based alloys having different coefficients of thermal expansion can achieve a reduction in thermal protrusion similar to those described above.

Shown in FIG. 2B is a magnetic head having a lower shield and an upper shield each of which has a four-layered structure. More specifically, each of the lower shield and the upper shield is a stack of layers consisting of magnetic material layers 3a and 6a having a low coefficient of thermal expansion and 80 wt % NiFe alloy layers 3b and 6b.

Thermal protrusions of a conventional magnetic head and thin film magnetic heads of the present embodiment were evaluated. The thin film magnetic head of the present embodiment shown in FIG. 2A was prototyped to evaluate the thermal protrusion thereof. The conventional magnetic head was manufactured such that it has the same structure as that shown in FIG. 1 and an upper shield and a lower shield are formed from 80 wt % NiFe. A thin film magnetic head of the present embodiment was manufactured such that it includes a lower shield lower layer 3a of 46 wt % NiFe alloy having a thickness of 1.1 µm, a lower shield upper layer 3b of 80 wt % NiFe alloy having a thickness of 1.0 µm, an upper shield lower layer 6b of 80 wt % NiFe alloy having a thickness of 0.5 µm, and an upper shield upper layer 6a of 46 wt % NiFe alloy. The thermal protrusion of each of the magnetic heads was evaluated by optically measuring changes in shape of an air bearing surface caused by increases in ambient temperature. Results of the evaluation are shown in Table 3.

TABLE 3

| Head Structure | Conventional Example | Example 4 | Example 5 |
|---|---|---|---|
| lower shield lower material thickness (µm) | 80 wt % NiFe 2.1 | 46 wt % NiFe 2.1 | 46 wt % NiFe 1.1 |
| lower shield upper material thickness (µm) | — | — | 80 wt % NiFe 1.0 |
| upper shield lower material thickness (µm) | 80 wt % NiFe 1.3 | 46 wt % NiFe 1.3 | 80 wt % NiFe 0.5 |
| upper shield upper material thickness (µm) | — | — | 46 wt % NiFe 0.8 |
| protrusion amount (nm/10 C°) | 0.9 | 0.40 | 0.65 |
| protrusion ratio | 1 | 0.44 | 0.72 |
| pass rate in after-record noise test (%) | 97.8 | 87.5 | 100 |

As shown in Table 3, the thermal protrusion of the thin film magnetic head of Example 4 wherein 46 wt % NiFe is used in place of 80 wt % NiFe for forming the upper and lower shields is reduced to about 40% of that of the conventional magnetic head. The thermal protrusion of Example 5 wherein 46 wt % NiFe of an amount corresponding to 55% of the total thickness of the upper and lower shields is used in place of 80 wt % NiFe is reduced to about 70% of that of the conventional magnetic head. The lower pole front end layer 9, the lower pole back end layer 10, the upper pole front end layer 12, and the upper pole back end layer 13 of each of the experimental thin film magnetic heads are formed from CoNiFe alloy. Therefore, the determined values of the amounts of protrusion shown in Table 3 are slightly larger than the calculated values of the amounts of protrusion shown in Table 2. However, the relationship between the film thickness ratio of the 46 wt % NiFe alloy layer to the whole magnetic shield and the height of protrusion due to the thermal protrusion in the calculated values is almost identical with that in the measured values. In addition, it was confirmed that the reduction in thermal protrusion was achieved by using the magnetic material having a low coefficient of thermal expansion for the magnetic shield in place of 80 wt. % NiFe having a high coefficient of thermal expansion.

With regard to the prevention of increase in noise in read output, that is, another object of the present invention, noise in output waveform occurring after a write operation was measured. Noise in read out may occur due to the magnetic shield. This noise often occurs such that when a write current is applied to a coil, a read magnetic flux flows into the magnetic shield to change a magnetic domain structure of the magnetic shield thereby causing the noise, in the shape of a spike, in the read element. Such phenomenon is referred to as "after-record noise" in the present specification. In order to evaluate the after-record noise, an after-record noise test was carried out in such a manner that a magnetic head in which noise of 100 µV or higher occurred 10 times or more after 5,000 times of application of the write current was rejected so as to detect pass rates of the magnetic heads. Results of the test are shown in Table 3. Referring to Table 3, the thin film magnetic head of Example 4 having the magnetic shield formed from 46 wt. % NiFe has a lower pass rate as compared with the conventional example; however, the thin film magnetic head of Example 5 having the magnetic shields each of which is the stack of layers consisting of the 80 wt. % NiFe alloy layer and the 46 wt. % NiFe alloy layer has a pass rate higher than that of the conventional thin film magnetic head. The reason for the high pass rate has not been clarified, but it is presumed that the stack of layers makes the magnetic domain structure less liable to change, thereby making the after-record noise less liable to occur. As described above, the present invention provides a thin film magnetic head that is capable of reducing the thermal protrusion and the after-record noise.

In addition, the NiFe alloy mainly comprising 80 wt % Ni and the alloy mainly comprising 46 wt % Ni are used for the examination in the embodiments of the present invention. Each of the compositions of these alloys may probably be changed in the range of about ±3 wt %; however, if changed, the same effect will be provided.

Apart from the crystal alloys such as the NiFe alloys, amorphous alloys are usable for forming the magnetic shield. Examples of the amorphous alloys may be CoTaZr, CoNbZr, and like alloys, each of which may have a low coefficient of thermal expansion depending on the composition thereof. However, it has been reported that the use of these materials increases the after-record noise in some cases. In addition, because of low thermal conductivity, these materials are not always preferred from the standpoint of the reduction in thermal protrusion.

The present invention is basically applicable to the head structure shown in FIG. 1 wherein the upper shield is separated from the lower pole piece. In the head structure having the integrated upper shield and lower pole piece, the after-record noise tends to occur if the 46 wt % NiFe alloy is used as the shield material, because the write flux flows directly into the magnetic shield to change the magnetic domain structure.

The application of the present invention is not limited by structures, such as a read element structure, a lower pole structure, and an upper pole structure, but the magnetic shield structure described above. For example, while FIG. 1 shows the thin film magnetic head including the lower pole front end layer 9, the lower pole back end layer 10, the upper pole front end layer 12, and the upper pole back end layer 13, the present invention is applicable to the following thin film magnetic heads. One is that a lower pole front end layer 9 and a lower pole back end layer 10 are omitted and a lower pole front end is joined to an upper pole front end layer with a write gap disposed therebetween. Another is that a thin film magnetic head in which a coil 15 is disposed between a lower pole front end layer 9 and a lower pole back end layer 10 and an upper pole piece 17 has a flat surface. Yet another is that a lower pole front end layer 12 and an upper pole back end layer 13 are omitted, a coil 15 is disposed between a lower pole front end layer 9 and a lower pole back end layer 10, and a front end of a flat upper pole piece is joined to a lower pole front end layer with the upper pole piece being disposed on a write gap which is disposed between the upper pole piece and the lower pole piece. The present invention is effectively applicable to the thin film magnetic heads having the above-described write structures.

In the thin film magnetic heads of the present invention, the 46 wt % NiFe alloy having a low coefficient of thermal expansion is used for forming the lower pole piece 8 and the upper pole piece 17 of each of the write elements of the first and second embodiments. When the 80 wt % NiFe alloy is used in place of the 46 wt % NiFe alloy for forming the lower pole piece 8 having a thickness of 2 μm, the thermal protrusion of the lower magnetic shield is 0.2 nm per 10° C. of temperature rise, in accordance with the heat deformation calculation described in the first embodiment. Further, if the upper pole piece 17 having a thickness of 2 μm is formed from the 80 wt % NiFe alloy, the thermal protrusion of the protection film 18 increases by 0.2 nm per 10° C. of temperature rise while the thermal protrusion of the lower magnetic shield remains unchanged. Thus, in order to reduce the thermal protrusion, it is important to use the magnetic material having a low coefficient of thermal expansion for forming the write element. It is possible to provide the thin film magnetic head with decreased thermal protrusion by using the 46 wt % NiFe alloy having a low coefficient of thermal expansion for the lower pole piece 8 and the upper pole piece 17.

Figure 3:
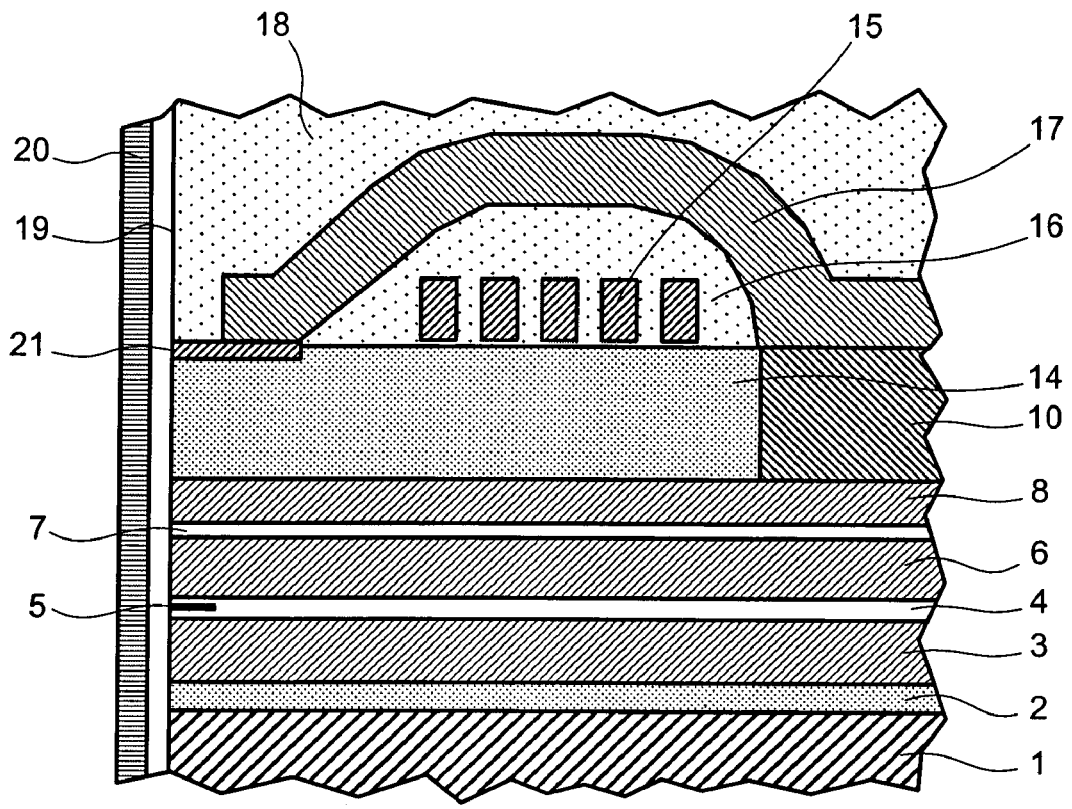
FIG. 3 is a cross-sectional view of a thin film magnetic head according to another embodiment of the present invention.

In the thin film magnetic head of the embodiments, the write element is described as using the conventional longitudinal recording type element as shown in FIG. 1; however, if a vertical recording type write element is used as the write element as shown in FIG. 3 to write and read data on and from the vertical medium, it is possible to achieve the same effects as those of the embodiments by adopting the above-described configuration to the vertical recording type write element. In the case of using the vertical write element shown in FIG. 3, the magnetic shields, the read element and the separation layer, which are denoted by reference numerals 1 to 7, are the same as those described above, while the lower pole piece 8 is used as an auxiliary pole piece and the main pole piece 21 is provided in place of the upper pole front end layer, thereby writing data on the vertical recording medium by use of the main pole piece.

Figure 4:
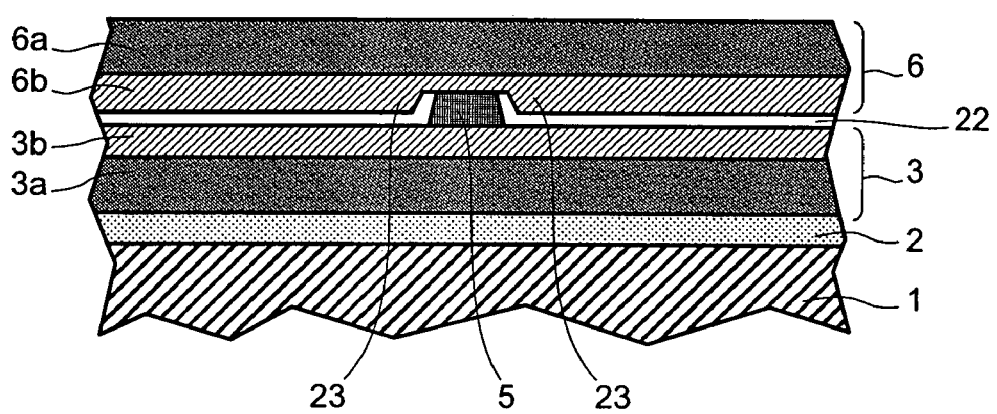
FIG. 4 is a plan view showing a magnetic shield and a read element of an thin film magnetic head according to another embodiment of the present invention.

In addition, it is possible to use a conventional CIP (read current longitudinal application type) GMR element, a TMR element, and a CIP (read current vertical application type) GMR as the read element in the embodiments. If any one of these elements is used as the read element, it is unnecessary to change the configuration of the head element to achieve the same effect. Further, the present invention is applicable to a side shield type thin film magnetic head wherein each of sides extending along the direction of the track width of the read element is provided with a shield as shown in FIG. 4. Shown in FIG. 4 is the read element and the magnetic shields as viewed from the air bearing surface. In the present embodiment, the TMR element or the CPP GMR element is used as the read element, and the read current is vertically applied to the read element. Therefore, the upper and lower shields serve also as electrodes for the read element 5. Denoted by 22 is an insulation layer for the upper and lower shields. It is possible to improve the read resolution in the direction of track width by providing each of the sides of the read element with the side shield 23. If the laminated film consisting of the layer of the magnetic material having a low coefficient of thermal expansion and the 80 wt % NiFe alloy layer is used for the magnetic shield in the present embodiment, the magnetic shield is disposed in such a manner that the 80 wt. % alloy layer faces the read element in the same manner as in FIG. 2A.

A disk storage device using the thin film magnetic head of the present invention can achieve the low flying height owing to the reduction in thermal protrusion. The present invention is particularly effective in ensuring reliability of a disk storage device, in a hot environment, which achieves a high recording density and a low flying height. In this case, the low flying height is a mechanical flying height of 20 nm or less from a surface of an extremely thin protection film usually formed on an air bearing surface of a magnetic head to the respective surfaces of an extremely thin protection film and a lubricant layer, both of which are usually formed on a surface of a recording medium.

As described above, it is possible to reduce the thermal protrusion by using the magnetic material having a low coefficient of thermal expansion of $11.5 \times 10^{-6}$/K or less for the magnetic shield of the thin film magnetic head. Further, it is possible to provide the thin film magnetic head achieving reduced thermal protrusion and reduced after-record noise by using a laminated film consisting of the 80 wt % NiFe alloy layer and the layer of the magnetic material having the low coefficient of thermal expansion for the magnetic shield.

What is claimed is:

1. A thin film magnetic head comprising:
   a read unit, formed above a substrate, having a lower shield, a read element and an upper shield; and
   a write unit having a lower pole piece, an upper pole piece, and a coil placed between said lower pole piece and said upper pole piece,
   said read unit and said write unit being separated from each other with a non-magnetic material;
   wherein at least one of said lower shield and upper shield has a first layer and a second layer formed from magnetic material;
   wherein the coefficient of thermal expansion of said first layer is different from the coefficient of thermal expansion of said second layer;
   wherein the coefficient of thermal expansion of said first layer is larger than the coefficient of thermal expansion of said second layer; and
   wherein said first layer is formed between said second layer and said read element.

2. A thin film magnetic head according to claim 1, wherein said second layer is a crystalline magnetic alloy.

3. A thin film magnetic head according to claim 1, wherein said second layer is a NiFe alloy having a composition comprising 30 to 55 wt % Ni.

4. A thin film magnetic head according to claim 1, wherein said first layer is formed from a NiFe alloy having a composition mainly comprising 80 wt % Ni, said 80 wt % NiFe alloy layer facing to said read element.

5. A thin film magnetic head according to claim 4, wherein said second layer is a crystalline magnetic alloy.

6. A thin film magnetic head according to claim 4, wherein said second layer is a NiFe alloy having a composition comprising 30 to 55 wt % Ni.

7. A thin film magnetic head according to claim 1, wherein a ratio of a thickness of said second layer to a sum of thicknesses of said lower shield and said upper shield is 30% or more.

8. A thin film magnetic head according to claim 7, wherein said second layer is a crystalline magnetic alloy.

9. A thin film magnetic head according to claim 7, wherein said second layer is a NiFe alloy having a composition comprising 30 to 55 wt % Ni.

10. A thin film magnetic head according to claim 1, wherein the coefficient of thermal expansion of said second layer is $11.5 \times 10^{-6}$/K or less.

11. A thin film magnetic head according to claim 1, wherein said first layer and said second layer are magnetically connected.

12. A disk storage device comprising:
a recording medium;
a drive motor for driving said recording medium;
a magnetic head for reading and writing data from and on said recording medium;
a positioning mechanism for positioning said magnetic head;
a first circuit system for controlling said recording medium, said drive motor, said magnetic head, and said positioning mechanism; and
a second circuit system for supplying a write signal to said magnetic head and processing a read signal from said magnetic head;
wherein said magnetic head comprises:
a read unit, formed above a substrate, having a lower shield, a read element and an upper shield; and
a write unit having a lower pole piece, an upper pole piece, and a coil placed between said lower pole piece and said upper pole piece,
said read unit and said write unit being separated from each other with a non-magnetic material;
wherein at least one of said lower shield and upper shield has a first layer and a second layer formed from magnetic material;
wherein the coefficient of thermal expansion of said first layer is different from the coefficient of thermal expansion of said second layer;
wherein the coefficient of thermal expansion of said first layer is larger than the coefficient of thermal expansion of said second layer; and
wherein said first layer is formed between said second layer and said read element.

13. A disk storage device according to claim 12, wherein the coefficient of thermal expansion of said second layer is $11.5 \times 10^{-6}$/K or less.

14. A disk storage device according to claim 12, wherein said first layer and said second layer are magnetically connected.

* * * * *